INVENTORS.
GRADY E. POPE and
BY JESSE D. ARMSTRONG, JR.

*Fishburn and Gold*
ATTORNEYS

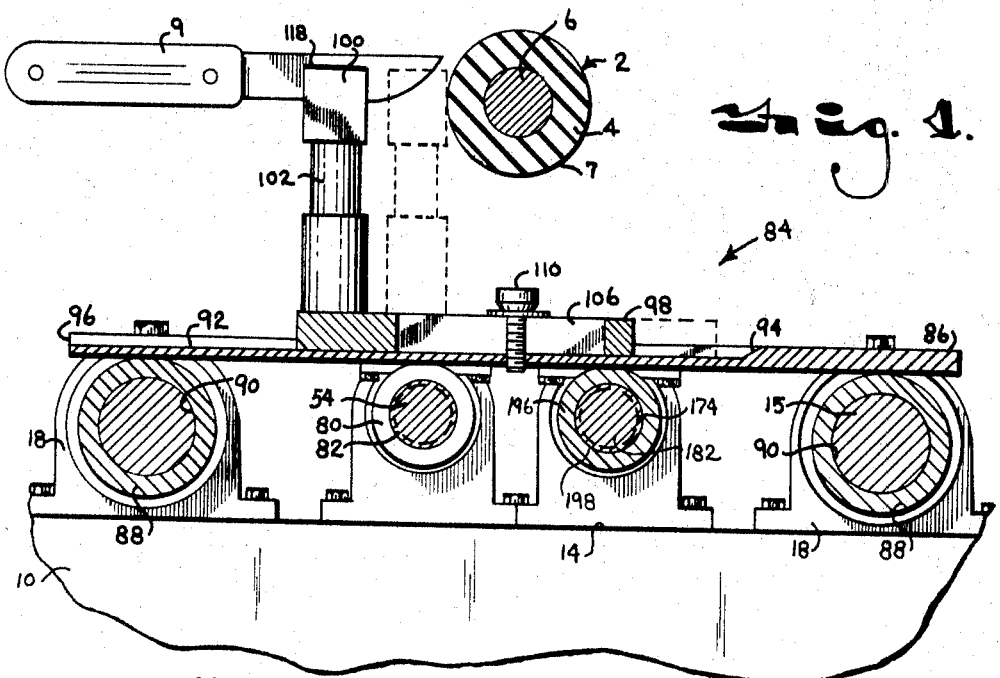
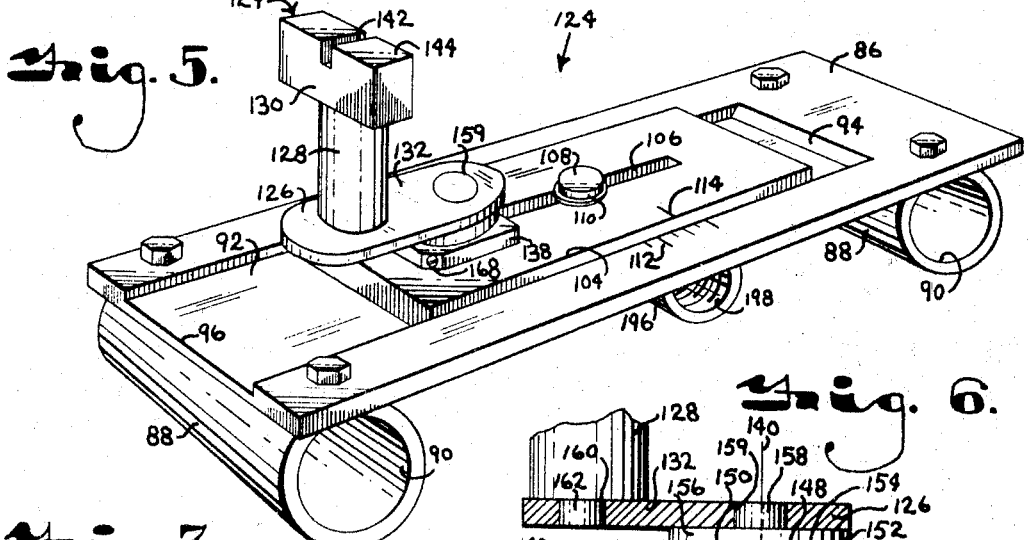
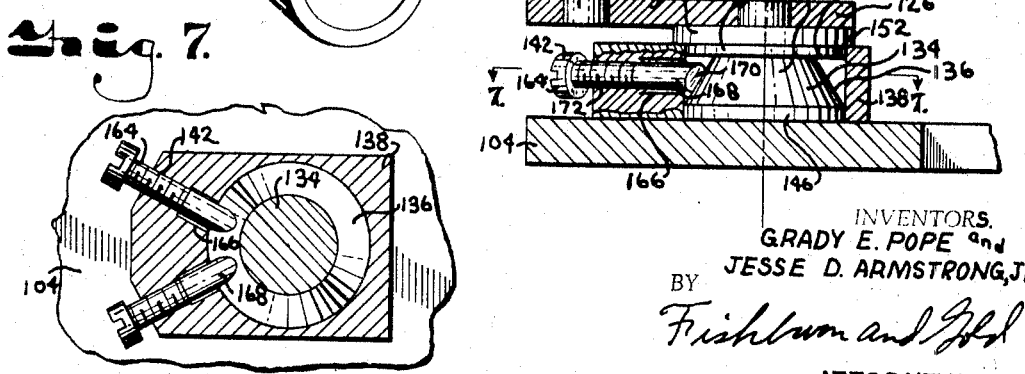
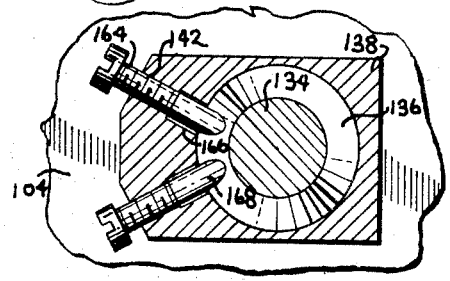

3,442,166
ROLLER TRIMMING AND CENTERING
APPARATUS
Grady E. Pope and Jesse D. Armstrong, Jr., Overland Park, Kans., assignors to American Superior Rubber Roller Company, Kansas City, Mo., a corporation of Missouri
Filed Aug. 29, 1966, Ser. No. 575,617
Int. Cl. B23b 5/14, 5/28
U.S. Cl. 82—101      11 Claims

ABSTRACT OF THE DISCLOSURE

Apparatus for reconditioning rubber covered printing rollers and the like includes a frame having a central reference plane and head and tail stock means on the frame and associated with adjusting means for selectively simultaneously moving the head and tail stock means toward and away form the reference plane while maintaining equally spaced relation to the reference plane. Similar structure is provided to control the positioning of guide means for holding trimming tools.

---

This invention relates to accurate relative positioning of a work piece and tool means and more particularly, to a new and novel apparatus for accurately and rapidly locating a tool means relative to the roll portion of a roller means such as a press roller for trimming said roller portion.

In various arts, as for instance, the reconditioning of printing rollers having roll portions comprised of rubber or other similar material mounted on a metallic shaft, it is necessary to accurately position the roll portion on said metallic shaft and develop a final roll portion of a specific length and diameter. In the past, this operation has been conducted, in this particular art, by manual measurement to locate the center of the roll portion which usually coincides with the center of the shaft and then further manual measurement in each direction from said center along said shaft a predetermined length to locate the ends of the roll portion such that the roll portions may be trimmed to a specific length and located upon the metallic shaft. It is also necessary, in this particular art, to bevel the end edges of certain roll portions and to do so prior to grinding the roll portion itself to the desired diameter. As the trimming process tends to form undesirable high spots along the trimmed edge, the grinding operation follows the trimming operation to remove said high spots. Thus, the procedure of manual measurement is further complicated as it is necessary to compensate for the reduced thickness of the roll when forming the beveled edge to develop a rolling surface on the roll portion of the desired length after the grinding operation effects a change in the length of the rolling surface of the roll portion along each of the beveled edges as the diameter of the roll portion at the beveled edge is reduced.

The principal objects of this invention are to alleviate the aforementioned difficulties in the various arts by providing a new and novel apparatus for accurately and rapidly positioning a work piece relative to a reference point and locating a tool means to be employed on said work piece with similar accuracy and speed; to provide such an apparatus for use with rollers having a roll portion formed of rubber or the like where said apparatus efficiently and accurately positions a tool for trimming the end portions of said roll to properly locate the roll portion on a roller shaft and to develop a roll portion of the desired length; to provide such an apparatus which will position a roller relative to a reference point such as the center point of said roller and accurately and simultaneously position a pair of trimming tool guides on opposed sides of said reference point at opposed ends of the roll portion of said roller whereby said end portions may be accurately trimmed; to provide such an apparatus where the tool guides are movable longitudinally of said reference point and are movable transversely of said roller in a predetermined manner to accurately locate a beveled edge on the ends of said roll portion such that a subsequent grinding operation reducing the roll diameter results in a pair of opposed beveled edges defining a roll portion of the desired length; to provide such an apparatus having a pair of opposed rotatable spindles suitably mounted on a frame for reciprocal movement toward and away from a reference point, said spindles having means thereon for receiving a work piece such as the opposed ends of a roller to retain said roller in a desired position and means for rotatably driving at least one of said spindles; to provide such an apparatus having a guide block with guide means thereon, said guide block being rotatably mounted to permit positioning of a trimming tool in a multitude of angles relative to a roller or the like; to provide such an apparatus which may be easily and inexpensively manufactured, installed and operated to effectively reduce production costs.

Other objects and advantages of this invention will become apparent from the following description taken in connection with the accompanying drawings wherein are set forth by way of illustration and example certain embodiments of this invention.

FIG. 2 is a plan view of the apparatus shown in FIG. 1 with a portion of a head stock broken away to show the belt drive system to a rotatable spindle of the head stock employed for retaining and rotatably driving a roller or the like.

FIG. 4 is a vertical sectional view taken on line 4—4 of FIG. 2 showing a tool guide mechanism having a guide block relative to a roller member and operatively mounted to a lead screw and a member of the frame of the apparatus which supports the guide blocks in a slidable manner.

FIG. 5 is a perspective view of a modified form of the guide mechanism illustrated in FIG. 4 having a rotatable supporting column movable to selected positions for locking engagement in said positions such that the slot or tool guide means in the guide block may be positioned in a plurality of angular relations to the work piece on which the tool is to be employed.

FIG. 6 is a fragmentary vertical sectional view taken on line 6—6 of FIG. 5 illustrating the mechanism to be employed for adjusting the angular relationship of the guide block to the work piece.

FIG. 7 is a fragmentary horizontal sectional view taken on line 7—7 of FIG. 6 illustrating the locking mechanism employed to fix the rotational position of the guide block.

Figure 1:
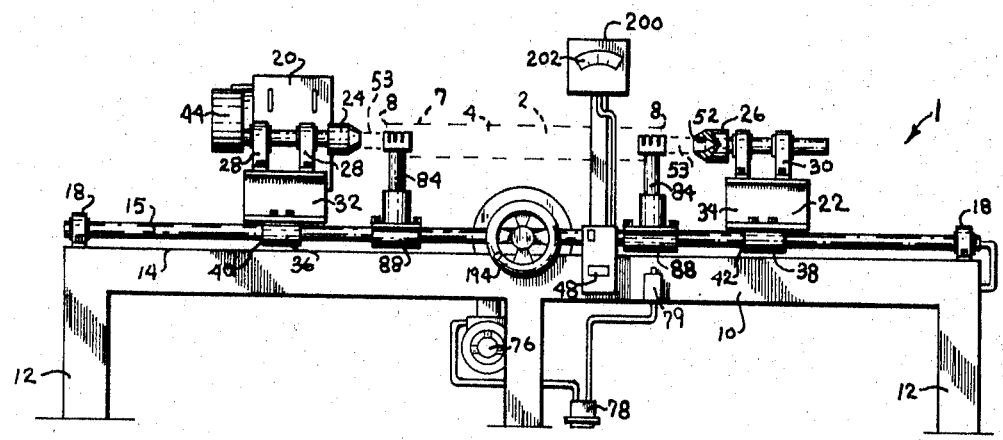
FIG. 1 is a side elevational view of the apparatus embodying the features of this invention shown with the rotatable spindles retaining a roller member (shown in broken lines) in the desired position with the guide blocks properly positioned for receiving a trimming tool to effect the trimming of the opposed ends of the roll portion of said roller member.
Figure 2:
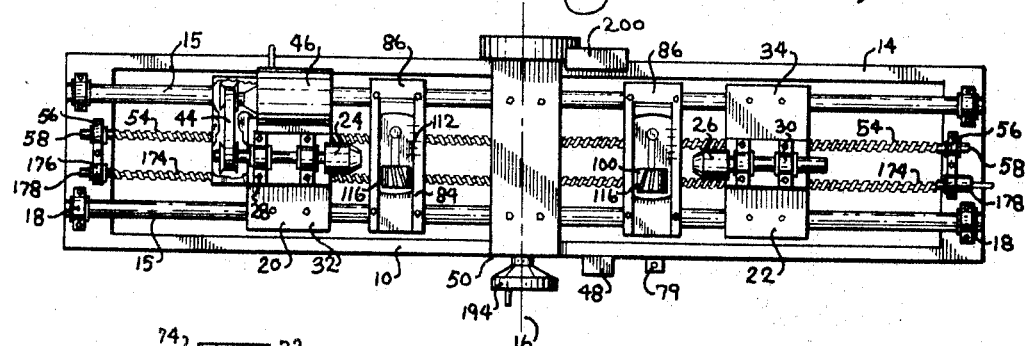

Referring to the drawings in more detail.

The reference numeral 1 broadly applies to an apparatus for the relative positioning of tools and a work piece embodying the features of this invention and illustrated herein in relation to the positioning of a roller 2, said roller 2 having a roll portion 4 of a material such as rubber or the like mounted on a metallic shaft 6, and defining a rolling surface 7, relative to a trimming tool such as a knife 9 or the like for use in trimming the opposed ends 8 of the roll portion 4 in an accurate manner relative to the shaft 6 to define a roll portion 4 of a desired length properly positioned on said shaft 6. The apparatus 1 includes a frame or supporting table structure 10 illustrated herein as an opening framework having a plurality of supporting legs 12 and an open supporting surface 14. The support surface 14 of the frame 10 has a reference line or plane 16 illustrated herein as centrally bisecting the supporting surface 14 with said line 16 being employed as a reference for the accurate positioning of a work piece relative to the supporting surface 14 and the positioning of tools relative to the workpiece. The framework 10 is exemplary only as it is illustrative of the type of mounting member for receiving the various mechanisms for the relative positioning of the work piece and the work tools. Other and different forms and shapes of mounting members may be employed in order to accomplish the desired results.

The frame member 10 includes a pair of opposed, spaced longitudinally extending ways or shaft-like slide members 15 operatively connected to the supporting surface 14 of the frame member 10 by means of brackets 18 disposed at the opposed ends of the ways 15. The ways 15 are employed as a support member for sliding engagement by the various mechanisms employed by the apparatus 1 for positioning the work piece and work tools relative to the reference line 16.

In the illustrated embodiment, the roller 2 is retained in a desired elevated position relative to the reference line 16 by means of a head stock mechanism 20 and a tail stock mechanism 22. Each of the head and tail stocks 20 and 22 include rotatably mounted spindles 24 and 26, respectively, rotatably received in bearing bracket assemblies 28 and 30 respectively which are mounted on support members 32 and 34 respectively. Each of the supporting members 32 and 34 extend transversely of the supporting surface 14 in overlying relation to the ways 15 and have mounted at their opposed transverse end portions, a pair of spaced sleeve members 36 and 38 respectively. The sleeve members 36 and 38 define longitudinally oriented bores 40 and 42 respectively with a corresponding aligned sleeve member 36 and 38 on each of the head and tail stocks 20 and 22 receiving ways 15 through the respective bores 40 and 42 to thereby slidably mount the head and tail stocks 20 and 22 in desired relative positions on opposed, longitudinal sides of the reference line 16 and on the supporting surface 14 of the frame 10.

The rotatably driven spindle 24 of the head stock 20, as illustrated, is operatively connected by means of a pulley-belt drive system 44 to a reversibly driven motor 46 illustrated herein as an electric motor and operable from switching means 48 located at the operator's station 50 in the central portion of the apparatus 1. Each of the spindles 24 and 26 has inwardly tapered bores 52 for receiving the tapered end portions 53 of the shaft 6 of the roller 2, said apertures 52 in spindles 24 and 26 being axially aligned to retain the roller 2 in a desired horizontal position.

The head and tail stocks 20 and 22 respectively are operatively driven in a reciprocal manner toward and away from the reference line 16 by means of a rotatably driven lead screw 54 extending longitudinally of the supporting surface 14 of frame 10 in a spaced parallel relation to the ways 15, and as illustrated, between said ways 15. The lead screw 54 is operatively mounted to supporting surface 14 by means of a pair of bracket bearing assemblies 56 disposed at opposed ends of the supporting surface 14 and operatively receiving the opposed longitudinal ends 58 of the lead screw 54. The central portion 60 of the lead screw 54 is shaft-like in form lacking the screw threads of the remainder of the lead screw 54 and is operatively mounted to a transversely extending frame plate 62 by a pair of spaced bracket-bearing assemblies 64 thereby operatively supporting the central portion 60 of the lead screw 54 in a desired position. A bevel gear 66, as illustrated, is operatively connected to the central portion 60 of the lead screw 54 in cooperative relation with a second bevel gear 68 operatively connected to a shaft 70 having a pulley 72 operatively connected by a belt 74 in an electric motor 76. The electric motor 76 is selectively activated by means of a foot pedal switching mechanism 78 and a switch 79 for selectively rotating the lead screw 54 for reciprocal movement of the head and tail stocks 20 and 22 inwardly and outwardly from the reference line 16. The foot pedal switching mechanism 78 is employed so that the operator will have both hands free for positioning the opposed ends 53 of the roller 2 in the aligned apertures 52 of the opposed spindles 24 and 26 of the head and tail stocks 20 and 22 as the head and tail stocks 20 and 22 are drawn together by the rotation of the lead screw 54. The switch 79, as illustrated, is employed to reverse the driving direction of the lead screw 54.

Each of the head and tail stocks 20 and 22 respectively have operatively mounted on the underside thereof a sleeve member 80 defining an interiorly threaded longitudinally oriented bore 82 having mating threads to the threads of the lead screw 54 and receiving the lead screw 54 therethrough. It should be noted that the lead screw 54 is divided into a pair of lead screw portions 83 and 85 on opposed sides of the central portion 60 wherein the screw threads are reversely oriented such that rotation of the lead screw 54 in a particular direction will effect a movement of the head and tail stocks 20 and 22 in opposite direction such that said head and tail stocks 20 and 22 may be simultaneously moved either inwardly or outwardly from the reference line 16 for receiving or releasing the end portions 53 of the roller 2.

A tool positioning means 84 is disposed in the illustrated embodiment on opposed sides of the reference line 16 in equally spaced relation from said reference line 16 between the reference line 16 and the head and tail stocks 20 and 22. The tool positioning means 84 are each employed for the positioning of a tool means relative to a work piece and in this instance, of a trimming tool such as a knife or the like relative to the opposed ends 8 of the roll portion 4 of the roller 2 in order to accurately trim the roll portion 4 at specific points on the shaft 6, in order to thereby define a roll portion 4 of a desired length and in a desired position on the shaft 6.

The tool positioning means 84 are each comprised of a transversely extending mounting member 86 having a pair of opposed spaced sleeve members 88 operatively connected thereto on the underside thereof, each defining a smooth bore 90 like sleeve members 36 and 38 for slidably receiving the opposed ways 15 on the supporting surface 14 of the frame 10. The mounting plates 86 each include a transversely extending way or groove 92 illustrated herein as having a closed end 94 and an open end 96. The groove 92 is employed for receiving a transversely slidable guide member 98 comprised of a tool guide or positioning block 100, a supporting column 102 and a bore plate 104. The guide member 98 is transversely adjustable by sliding movement through the groove 92 for positioning of the tool guide or positioning block 100 which is supported on the column 102 connected to the base plate or moveable member 104. The base plate or moveable member 104 which is disposed in sliding engagement in the groove 92 defines a transversely extending slot 106 therethrough which may be termed an adjustment slot 106.

A locking mechanism 108, illustrated herein as a bolt having a locking head 110, is disposed through the adjustment slot 106 and into threading engagement with the mounting member 86 and is employed for clamping the base plate 104 of the guide 98 in a selected position relative to the transverse groove 92. The mounting member 86 contains a graduated scale 112 for alignment with an index line 114 on the base plate 104 for positioning the guide member 98 in a desired manner relative to the roll portion 4 of the roller 2.

The guide block 100 of the guide member 98, as illustrated, includes a plurality of transversely directed slots 116 in its upper surface 118 wherein a tool such as a knife blade may be disposed with the cutting edge directed against a revolving roller portion 4 to effectively trim the roller portion at the desired point. In the illustrated embodiment, the slots 116 are disposed at various angles relative to the roll portion 4 to permit the formation of either straight or beveled edges at the end portions 8 of the roller 4. Scale 112 is designed for the development of a beveled edge on the end 8 of the roll portion 4 corresponding to the finished diameter of the roll portion 4 after grinding of the roll portion 4 to its final diameter. As the guide member 98 is moved transversely in the groove 92, the point at which the knife protruding from the guide block 100 strikes the roll portion 4 varies dependent upon the spacing of the guide block 100 from the side edges of the roll portion 4 of the roller 2. In this manner, the desired angular bevel may be placed at precisely the point desired for a specific finished diameter roll even though the grinding operation has not taken place and the roll diameter has not been reduced to its finished diameter.

Referring to FIGS. 5 and 6, a modified form of a guide member is illustrated and generally designated by the reference numeral 124. The guide member 124 like the guide member 98 has a base plate 104 having a transversely extending groove 106 and is received in the transversely extending groove 92 of the mounting plate 86. The base plate 104 has a rotatable mounting assembly 126 operatively connected thereto for receiving a supporting column 128 having a tool positioning block 130 at its upper end portion. The mounting assembly 126 includes a mounting plate 132, a rotatable member 134 having a bevel shaped edge portion 136, said member 134 being rotatably retained in a housing 138 for rotation about its central vertical axis indicated by the line 140. The line 140 forming the axis of rotation of a guide block 130 may be adjusted to coincide with a plane through the finished diameter of the roll portion 4 of the roller 2 such that a transversely directed slot 142 in the upper surface 144 of the guide block 130 will be directed along a line forming the radius of an arc whose center point lies on the line 140 at the point of the finished diameter of the roller 4. In this manner, the slot 142 may be disposed at any of a plurality of angular relations to the roll portion 4 for forming variously oriented beveled edges at the ends 8 of the roll portion 4.

The rotatable member 134, as illustrated, is generally disc-like in form including a lower portion 146 in contacting rotatable relation to the base place 104, a central portion 148 defining an upwardly extending, inwardly directed beveled edge surface 136 and an upper portion 150 having an outer annular edge portion 152 defining a ledge 154 overlying the beveled surface 136. The upper portion 150 of the rotatable member 134 includes an upper member 156 which overlies the housing 138 and is positioned in contacting relation thereto, said upper member 156 having an outer edge with a graduated scale formed thereon to cooperate with an index line on the housing 138 to indicate the angular disposition of the slot 142 or disposition of the trimming tool. A stud or shaft 158 is operatively connected to the upper member 156 and extends upwardly for receipt in a bore 159 defined in the mounting plate 132, said stud 158 being welded to plate 132 or otherwise suitably connected thereto.

The plate 132 defines a second bore 160 for receipt of a stud or shaft 162 connected to the supporting column 128, said stud 162 being suitably connected to the plate 132 as by welding or the like. As the rotatable member 134 and plate 132 are rotatably moved about the axis 140, the supporting column 128 and guide block 130 are similarly rotated to the desired angular position.

The housing 138 is disposed circumferentially about the rotatable member 134 and includes a pair of locking means 142 each comprised of a bolt or set screw 164 which is received in each of a pair of threaded bores 166 to move an abutment means or plug 168 inwardly of said bore 166 into locking engagement with the bevel surface 136 of the rotatable member. The plugs 168 each have a forward end portion having an end surface 170 correspondingly shaped to the bevel surface 136 on the rotatable member 134 and adapted to engage said surface 136 to frictionally retain said rotatable member 134 in the desired position. The abutment plugs 168 are disposed between the upper portion 150 and the lower portion 146 of the rotatable member 134 in overlying relation to a part of the lower portion 146 to limit upward movement of the rotatable member 134 relative to the housing 138 even when a locking force is relieved on the plugs 168.

Referring to FIG. 7, the housing 138, as illustrated, includes a circumferentially extending side wall defining a through bore or inner chamber 172 having a generally vertical axis with a pair of bores 166 each having generally horizontal axis extending from the exterior of the housing 138 into communication with the bore 172. The bores 166, as illustrated, are angularly disposed relative to each other such that the abutment plugs 168 will effect angularly directed abutment forces against the rotatable member 134 to firmly retain same in the desired orientation.

Figure 3:
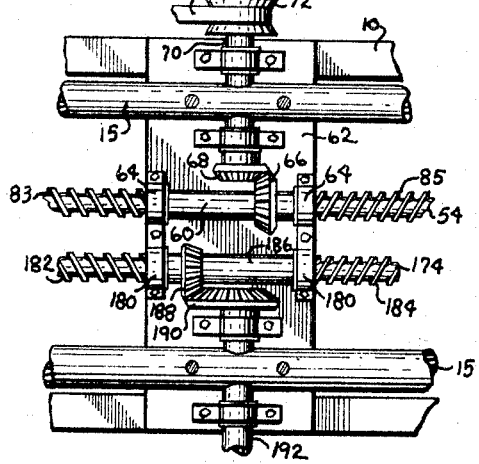
FIG. 3 is a fragmentary plan view of the apparatus shown in the FIG. 1 with the central cover plate removed to illustrate the gearing means of the drive systems to the pair of lead screws employed for positioning the rotatable spindles and the guide blocks relative to a reference point.

The frame 10 has a second lead screw 174 operatively connected thereto with a pair of bracket bearing assemblies 176 mounted to the supporting surface 14 at its opposed end portions for receiving the opposed ends 178 of the lead screw 174. As illustrated, in FIG. 3, the lead screw 174 is also supported on plate 62 by a pair of bearing bracket assemblies 180. Like the lead screw 54, the lead screw 174 is divided into a pair of lead screw portions 182 and 184 separated by a central shaft-like portion 186 on which is operatively connected a bevel gear 188. The bevel gear is designed for engagement with a second bevel gear 190 which is operatively connected to a shaft 192 connected to a hand crank or turning wheel 194 which is employed to manually actuate the lead screw portions 182 and 184 for reciprocal movement of the tool positioning means 84 inwardly and outwardly from the reference line 16 on opposed sides therof to properly position a tool such as a trimming tool relative to a work piece such as the roller 2 to position the trimming tool at the desired point at the opposed ends 8 of the roll portion 4.

The mounting plates 86 associated with the guides 84 or the guides 124, depending upon which form is utilized, each have operatively connected thereto a sleeve member 196 defining an interiorly threaded bore 198 having threads mating the threads of the lead screw portions 182 and 184 of lead screw 174 such that rotation of the lead screw 174 effects a relative movement of the mounting plates 86 inwardly and outwardly of the reference line 16. The lead screw portions 182 and 184 are reversely threaded such that a single rotation in a single direction effects a relative movement of both of the opposed tool positioning means 84 in a reverse direction to move them inwardly of the reference line 16 or outwardly away from the reference line 16 in a simultaneous, equally spaced manner from the reference line 16. By such action, a roll portion may be developed of a desired length and the roll portion may be placed in a desired position on a shaft also oriented relative to the reference line 16 by means of the head and tail stocks 20 and 22.

The lead screw 174 has a rotation indicating means or indicator 200 operatively connected to one end portion 178 thereof, said indicator 200 being operatively connected to a gauge 202 which is scaled to indicate the spacing of the tool positioning means 84 from the reference line 16. A conventional speedometer type indicator may be employed for the indicating means 200 such that the rotation of the lead screw 174 may be correlated to the distance of displacement of the tool positioning means 84 from the reference line 16.

In operation, the apparatus 1 as employed in the roll reconditioning art, has a roller 2 having a roll portion 4 of a rubber material or the like received in the rotatable spindles 24 and 26 by an operator holding the roller 2 in his hands, first moving the head and tail stock 20 and 22 outwardly a sufficient distance such that the ends of the spindles 24 and 26 clear the opposed ends 53 of the shaft 6 and then throwing the switch 79 and activating the motor 76 by depressing the foot pedal 78 in an opposite direction to move the head and tail stock 20 and 22 inwardly of the reference line 16 in an equally spaced manner from the reference line 16 to a point where the opposed end portions 53 of the shaft 6 of roller 2 are received in the opposed aligned aperture 52 of the spindles 24 and 26. The roller 2 has thereby been placed in a center position on the apparatus 1 with the opposed ends 53 of the shaft 6 each being disposed an equal distance from the reference line 16.

The hand crank 194 may then be rotated to actuate the lead screw 174 for moving the tool positioning means an equal distance from the reference line 16 on opposed sides thereof inwardly or outwardly from the reference line 16 to a desired setting dependent upon the desired length of the roll portion 4 of the roller 2.

Where a beveled edge is to be placed on the end portions 8 of the roll portion 4 of roller 2, the guide members 98 or 124, depending upon which is being utilized, will have to be adjusted transversely to compensate for the subsequent grinding operation which reduces the diameter of the roll portion 4. This is very simply accomplished by acquiring a particular setting on the scale 112 on the mounting plate 86. Where the guide 124 is employed, another setting will be required to set the slot 142 at the proper angular orientation relative to the desired bevel angle required at the ends 8 of the roll portion 4.

When the proper settings have been established through this very simple and expeditious operation, the motor 46 is activated to drive the spindle 24 of the head stock 20 to rotate the roll portion 4 of the roller 2 to effect the trimming operation. To trim the ends 8 of the roll portion 4, a knife or similar instrument is inserted in the slots 142 or 116 with a cutting edge directed outwardly against the roll portion 4 to cut the roll portion 4 as it is being rotated by the motor 46.

To remove the roller 2, it is merely necessary for the operator to actuate the switch 79, grasp the roller in his hands, then actuate the foot pedal 78 of the motor 76 for rotating the lead screw 54 to move the head and tail stocks 20 and 24 outwardly from the reference line 16 to release the end portions 53 of the roller 2 from the apertures 52 of the spindles 24 and 26 respectively. In this manner, a large quantity of rollers 2 may be accurately and quickly trimmed providing roll portions of the desired length and accurately positioned upon the shaft 6 thereby effectively reducing the production costs involved in reconditioning rollers of this nature.

It is to be understood that while we have illustrated and described one form of our invention, it is not to be limited to the specific form or arrangement of parts herein described and shown except insofar as such limitations are included in the claims.

What we claim and desire to secure by Letters Patent is:

1. An apparatus for positioning a work piece relative to a trimming tool, said work piece having opposed ends and a longitudinal axis, said apparatus comprising,
    (a) a frame having a reference plane,
    (b) pair of means for releasably retaining the opposed ends of said work piece, each of said retaining means being movably mounted on said frame on opposed sides of and equally spaced from said reference plane,
    (c) means operatively connected to said retaining means to rotatably drive said work piece about its longitudinal axis,
    (d) adjustment means operatively connected to said retaining means for selectively simultaneously moving said opposed retaining means toward and away from said reference plane while maintaining said equally spaced relation to said reference plane,
    (e) a pair of guide means for positioning said trimming tool in a desired position relative to said work piece, each of said guide means being movably mounted on said frame on opposed sides of said reference plane, and
    (f) means operatively connected to each of said guide means for simultaneously moving said opposed guide means toward and away from said reference plane.

2. An apparatus as recited in claim 1 wherein said means for retaining said work piece includes a pair of opposed rotatable spindles with means thereon for receiving the opposed ends of said work piece and wherein said driving means is operatively connected to at least one of said spindles for rotatably driving said spindle.

3. An apparatus as recited in claim 1 wherein said adjustment means is comprised of a longitudinally extending lead screw rotatably mounted on said frame and means operatively connected to said lead screw for selectively rotating said screw, said lead screw having reversely oriented screw threads on opposed sides of said reference plane with each of said retaining means defining a threaded bore for receiving said lead screw portions for movement of said retaining means relative to said reference plane upon rotation of said lead screw.

4. An apparatus as recited in claim 1 wherein said guide means are each operatively connected to an adjustment means and equally spaced on opposed sides from said reference plane, said adjustment means being for selective movement of said guide means relatively toward and away from said reference plane.

5. An apparatus as recited in claim 4 wherein said adjustment means is comprised of a longitudinally extending lead screw rotatably mounted on said frame and means operatively connected to said lead screw for selectively rotating said lead screw, said lead screw being comprised of a pair of lead screw portions on opposed sides of said reference plane, said portions having reversely oriented screw threads with each of said guide means defining a threaded bore for receiving said lead screw portions for movement of said guide means relative to said reference plane upon rotation of said lead screw.

6. An apparatus as recited in claim 1 wherein said guide means are each comprised of a mounting member, a movable member and cooperative means on said mounting and movable members for releasably retaining said members in a desired relation, said moveable member being moveable transversely of said work piece and selectively engaged with said mounting member in a releasable manner, said moveable member including means for positioning a trimming tool relative to said work piece.

7. An apparatus as recited in claim 6 wherein said positioning means on said moveable member includes a tool positioning block, said block having a plurality of tool positioning means thereon to orient said tool in a desired position relative to said work piece.

8. An apparatus as recited in claim 7 wherein said tool positioning means is comprised of at least one slot defined in said tool positioning block, said slot being adapted to receive therein a trimming tool to thereby position said tool relative to said work piece.

9. An apparatus as recited in claim 6 including means for rotatably connecting said tool positioning means to said moveable member to vary the angular relation of said trimming tool to said work piece.

10. An apparatus as recited in claim 9 wherein said guide means includes a rotatable member connected to said tool positioning means, means for rotatably mounting said rotatable member on said moveable member and cooperative members on said mounting means and said rotatable member for retaining said rotatable member in a desired rotational position on said moveable member.

11. An apparatus as recited in claim 10 wherein said rotatable member has a portion defining a bevel surface and wherein said mounting means includes a housing defining a bore having a generally vertical axis, said rotatable member being received in said bore in snugly fitting relation, said housing including set screw means received therein for engagement with said bevel surface to lock said rotatable member in a desired rotational position.

References Cited

UNITED STATES PATENTS

| | | | |
|---|---|---|---|
| 1,212,257 | 1/1917 | Pokora | 82—8 X |
| 1,510,811 | 10/1924 | Ward | 82—8 |
| 1,825,722 | 10/1931 | Forward et al. | 82—8 |
| 2,142,882 | 1/1939 | Benzon et al. | 82—8 |
| 3,177,743 | 4/1965 | Anderson et al. | 82—8 |

HARRISON L. HINSON, *Primary Examiner.*

U.S. Cl. X.R.

82—8